Oct. 7, 1958  E. G. CONGER ET AL  2,855,554
D. C. MOTOR SPEED REGULATOR CONTROL CIRCUIT
Filed Feb. 15, 1957  2 Sheets-Sheet 1

INVENTORS
Elmer G. Conger,
Hans Richard Ansgar Hansen,
By Byron Hume Broen & Clement
Attys Oct. 7, 1958          E. G. CONGER ET AL          2,855,554
D. C. MOTOR SPEED REGULATOR CONTROL CIRCUIT
Filed Feb. 15, 1957                    2 Sheets-Sheet 2
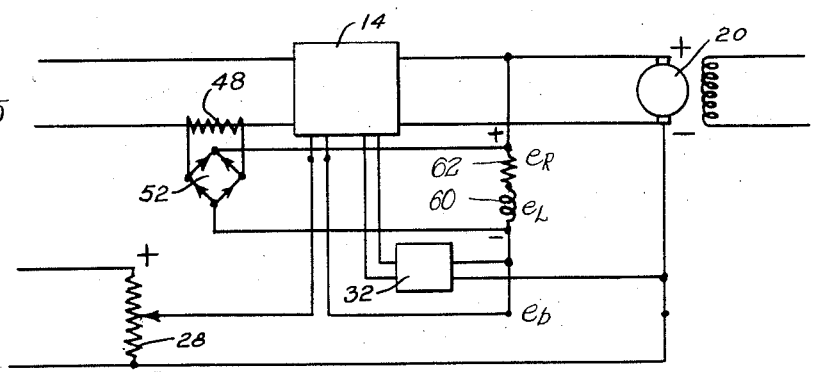
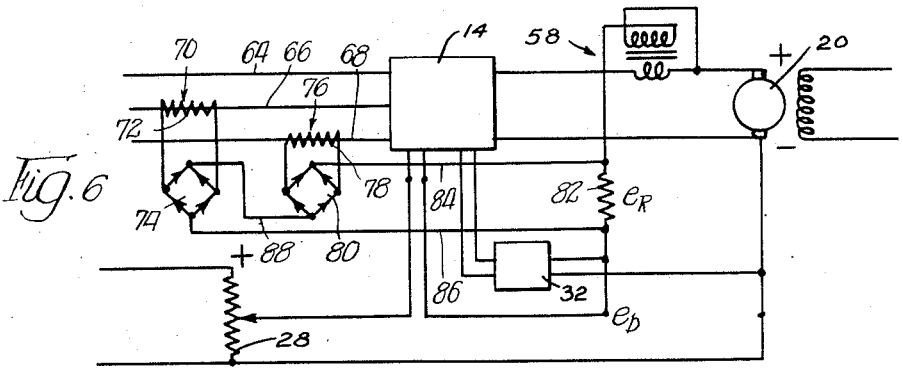
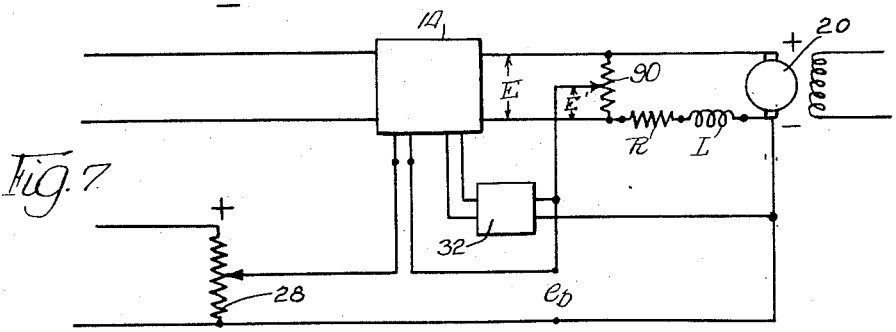
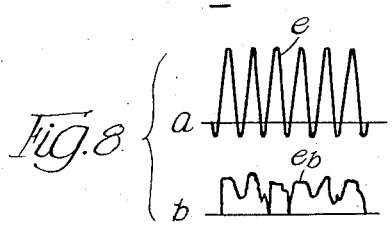
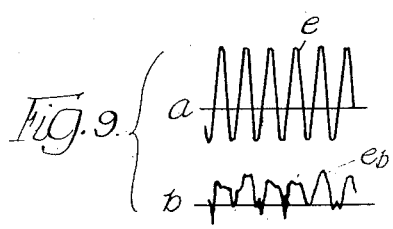
INVENTORS
Elmer G. Conger,
Hans Richard Ansgar Hansen,
By Byron Hume Groen & Clement
attys

United States Patent Office 2,855,554
Patented Oct. 7, 1958

2,855,554

D. C. MOTOR SPEED REGULATOR CONTROL CIRCUIT

Elmer G. Conger, Cudahy, and Hans Richard Ansgar Hansen, Milwaukee, Wis., assignors to The Louis Allis Co., Milwaukee, Wis., a corporation of Wisconsin Application February 15, 1957, Serial No. 641,001

14 Claims. (Cl. 318—308)

This invention relates to a motor speed regulator control circuit for direct current motor adjustable speed drives, and more particularly to a circuit of this type in which the speed of the direct current motor is varied by varying the applied unidirectional armature voltage.

This application is a continuation-in-part of applicants' copending application Serial No. 475,018, filed December 14, 1954, now abandoned.

It is an object of this invention to provide an adjustable speed drive utilizing a direct current motor which system has good stability, together with large speed range and close regulation.

Another object is to provide a circuit of the character described which has good response characteristics and in which the speed is maintained essentially constant, independent of load changes.

Still another object is to provide a circuit of the character described which, although simple in construction and operation, very closely approximates the type of regulation achieved with more complex circuits such as those utilizing a tachometer generator as the source feedback voltage.

Further objects and advantages of this invention will become evident as the description proceeds and from an examination of the accompanying drawing which illustrates several embodiments of the invention and in which similar numerals refer to similar parts throughout the several views.

In the drawings:

Figure 5 is a similar circuit diagram of an adjustable speed drive in which an alternative form of inductive voltage drop compensation is incorporation.

Figure 6 is a circuit diagram of an alternative form of adjustable speed drive similar to that shown in Figure 4, but adapted to be used with a three-phase, alternating current supply.

Figure 7 is a similar circuit diagram of an adjustable speed drive in which a voltage proportional to the motor E. M. F. is utilized as the feedback voltage, rather than one which is equal to the E. M. F. of the motor.

Figure 8 is a reproduction of comparative oscillograms for (a) the voltage applied to the motor, and (b) the feedback voltage in a circuit of the form shown in Figure 6 with a full load and at $\frac{1}{14}$ of full speed.

Figure 9 is a reproduction of comparative oscillograms for (a) the voltage applied to the motor, and (b) the feedback voltage in a circuit of the form shown in Figure 6 with a full load and at $\frac{1}{80}$ of full speed.

Figure 1:
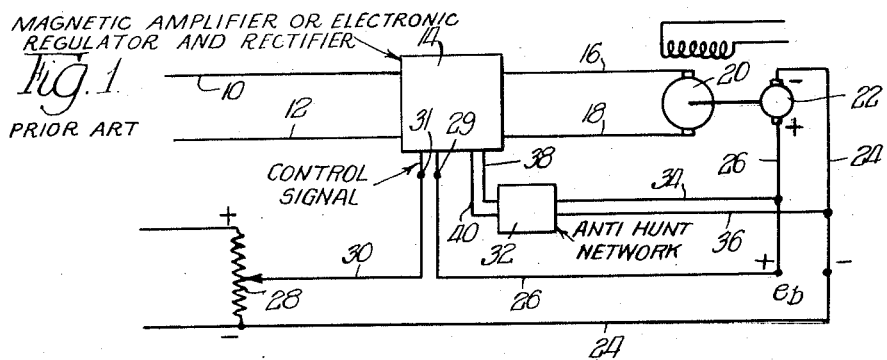
Figure 1 is a circuit diagram, with certain of the components thereof shown diagrammatically, of one form of adjustable speed drive in which a tachometer generator is utilized as a source of feedback voltage.

Referring now to Figure 1, a well-known circuit for an adjustable speed drive is shown therein. A source of alternating current is supplied through the lines 10 and 12 to the combination regulator and rectifier 14 which may include either an electronic or a magnetic amplifier form of regulator. Assuming for purposes of example that it is a magnetic amplifier having a direct current output, the output thereof is fed through the lines 16 and 18 to the armature 20 of the direct current motor to be controlled.

A tachometer generator 22 is driven by the armature 20 and a voltage therefrom is fed as a feedback voltage through the lines 24 and 26 to the potentiometer 28 and the control signal input terminal 29 of the magnetic amplifier 14, respectively. The resistance of potentiometer 28 is connected across a source of direct current, such as the output terminals of a rectifier. The movable arm of the potentiometer is connected through the line 30 to the control signal input terminal 31 of the magnetic amplifier. These latter connections are such that the reference voltage from the potentiometer 28 is fed into the magnetic amplifier with opposite polarity to the voltage from the tachometer generator. The voltage from the potentiometer can be varied to select the desired speed to which the motor 20 is to be regulated. The regulator or magnetic amplifier automatically adjusts the voltage applied to the armature 20 so that the feedback voltage from the tachometer generator 22 is kept substantially equal to the reference voltage. The speed of the motor incorporating the armature 20 is therefore maintained substantially constant regardless of load changes.

A conventional anti-hunt network 32 is also provided, being supplied through the lines 34 and 36 with the feedback signal from the tachometer generator. An anti-hunt signal is fed from the network to the magnetic amplifier through the lines 38 and 40. Such anti-hunt means are necessary to insure the stability of a regulator with a relatively large speed range and close regulation.

Figure 2:
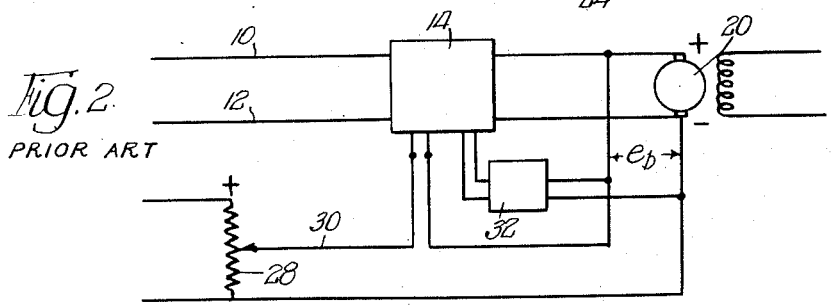
Figure 2 is a similar circuit diagram of an adjustable speed drive in which the feedback signal is taken across the armature of the direct current motor.

Figure 2 discloses another form of adjustable speed drive in which the tachometer generator is omitted and the feedback signal is taken across the armature. This feedback signal is balanced against a reference voltage from the potentiometer 28 and a constant armature voltage is therefore maintained. However, such an arrangement will result in a motor having a speed drop from no load to full load caused by the IR drop in the motor.

Since an adjustable unidirectional but pulsating voltage is fed to the armature, "steady state" in the true meaning of the word does not exist. The condition which is normally called "steady state" is actually a condition in which the same transient is repeated for every pulse, and the voltage which is applied to the armature must overcome not only IR drop and C. E. M. F., but also an inductive voltage drop ($Ldi/dt$—drop). In other words, the difference between the unidirectional voltage applied to the armature and the C. E. M. F., which is substantially a smooth D. C. voltage (because the speed is held substantially constant by the inertia in motor and load), is IR drop and $Ldi/dt$—drop. (The effect of capacitance in the winding can normally be neglected.)

Figure 3:
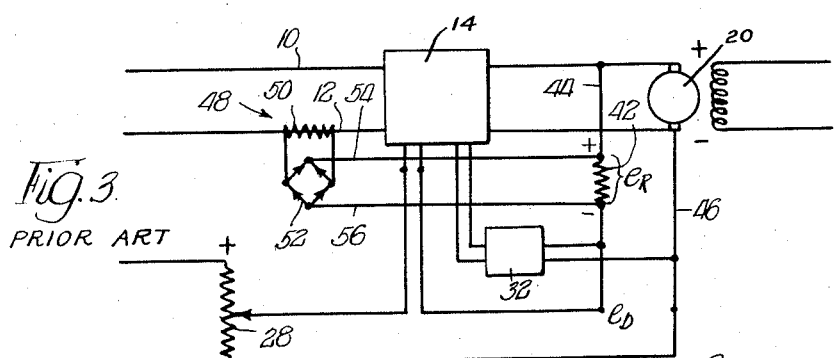
Figure 3 is a similar circuit diagram of an adjustable speed drive in which provision is made for compensation for the IR drop in the motor.

The circuit diagram shown in Figure 3 discloses one means of compensating for this IR drop which occurs in the type of circuit just discussed. A resistor 42 is inserted in the line 44 which, together with the line 46, forms the feedback circuit. A current transformer 48 has its primary connected in series with the alternating current input line 12 and its secondary 50 connected to the input terminals of the bridge rectifier network 52. The output of the bridge rectifier network 52 is fed through the lines 54 and 56 across the resistor 42.

This form of IR drop compensation is fully disclosed and discussed in copending application, Serial No. 385,986, filed October 14, 1953, in the names of Marwin W. Osborn, William J. Bradburn, Jr. and Hans Richard Ansgar Hansen, which application has been assigned to the same assignee as the present application.

The form of adjustable speed drive shown in Figure 3, although obviously preferable to that shown in Figure 2, is still not the equivalent in performance of the form shown in Figure 1. The circuit shown in Figure 1 is more accurate and gives a greater speed range, since speed ranges of 1/50 to 1/100 can be obtained rather easily, with a regulation from no load to full load of about 1 to 5 percent of the set speed, using suitable commercial types of regulators. With respect to the circuit shown in Figure 3, on the other hand, a speed range of between 1/8 and 1/20 with a regulation from no load to full load of about 5 to 15 percent of the set speed (5 percent with maximum speed and 15 percent with minimum speed) should be considered good performance, using standard power gain, single stage magnetic amplifier regulators.

The reason for the relatively poor performance of the circuit shown in Figure 3 is apparently the very high ripple content in the feedback voltage $e_b$, particularly when operating at a low speed. Since the ripple is often 5 to 10 times the direct current component, the high ripple voltage in the feedback and the anti-hunt circuit necessarily affects the amplifier gain and thus limits speed range and accuracy. This ripple can perhaps be more accurately described as the A. C. component in the total drop $(Ri+Ldi/dt)$, which has both a D. C. component and an A. C. component.

In previously known circuits IR drop compensation is used to derive a voltage which during (the so-called) steady state has an average value equal to the C. E. M. F. Such a scheme is shown in Figure 3. Experience shows that it is not possible with that scheme or with other previously known schemes, to obtain performance comparable to what can be obtained with tachometer feedback. An oscillogram of the feed back voltage $e_b$ reveals one of the reasons for the poor performance. The A. C. component (ripple) is so large that the voltage is unsuitable as feedback voltage for the magnetic amplifier (14) or the electronic circuit which is supplying the armature voltage.

It is possible to filter the direct feedback signal and such filtering is necessary to get the speed range of 1/20 mentioned above in the circuit shown in Figure 3. Such filtering, however, adversely affects the response characteristics of the circuit and, in addition, filtering cannot be used with the anti-hunt feedback signal, since it will make this portion of the circuit ineffective. In order to eliminate the effect of ripple on the amplifier gain by filtering the feedback signal, it is therefore necessary to omit the anti-hunt circuit, which is undesirable, since the lack of stability in such an instance limits adversely the speed range and regulation characteristics. On the other hand, if filtering is used for the direct feedback signal and an unfiltered anti-hunt circuit is used, the ripple voltage in the latter circuit will limit the performance.

Figure 4:
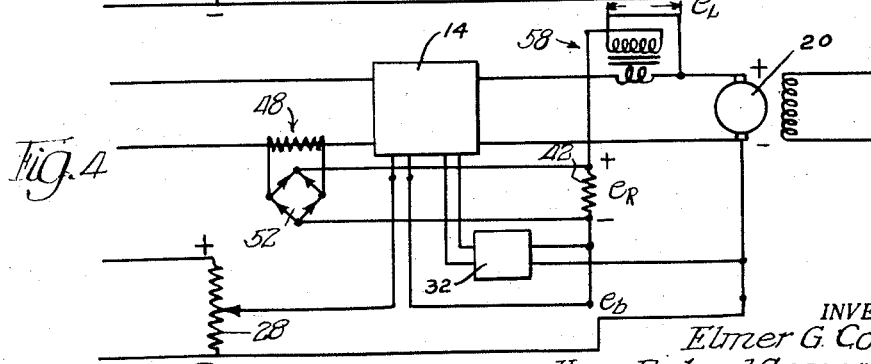
Figure 4 is a similar circuit diagram of an adjustable speed drive in which both IR drop compensation and inductive voltage drop compensation are provided.

The circuit shown in Figure 4 is a novel one which applicants have conceived to overcome this deficiency of the circuit shown in Figure 3 and to give substantially the same performance as the circuit shown in Figure 1, without the use of a tachometer generator. In addition, an air gap transformer 58 has been added, which transformer is adjusted so that the secondary voltage $e_L$ thereof is approximately equal to the inductive voltage drop $Ldi/dt$ in the motor. The IR compensation voltage $e_R$, as in the circuit shown in Figure 3, is approximately equal to the resistive voltage drop in the motor. With the polarity of the connections as shown in Figure 4, the feedback voltage $e_b$ is therefore approximately equal to the counter E. M. F. which, with constant speed, is a direct current voltage without ripple. The counter E. M. F. is substantially proportional to the speed of the motor, and with ideal rectifiers and ideal compensating means, the feedback voltage theoretically will be proportional to the motor speed, the same as the voltage that would be obtained from a tachometer generator. Theoretically, then, the performance of the adjustable speed drive shown in Figure 4 would be as good as the form shown in Figure 1.

The combination regulator and rectifier 14 in Figure 4 is shown in block diagram form, but as previously stated, can include either an electronic or magnetic amplifier form of regulator.

It has actually been possible in one case, using a two stage magnetic amplifier regulator, to obtain a speed range of 1/100 with a regulation of 3 percent of set speed over a 1/20 speed range and .15 percent of maximum speed from 1/20 to 1/100 of maximum speed.

Although only one form of IR compensation is shown in Figure 4, it is obvious that other well-known IR compensation means could be used in conjunction with the inductive voltage drop compensation as shown therein.

Likewise, alternative arrangements for obtaining the compensating inductance could be utilized, one form of which is shown in Figure 5. Here, the inductance 60 is disposed in series with the resistor 62, which is comparable to the resistor 42 shown in Figure 3. Here again, the voltage $e_L$ should be approximately equal to the inductive voltage drop in the motor.

Figure 6 shows a form of circuit which is useful with a three-phase alternating current supply obtained from the supply leads 64, 66 and 68. A current transformer 70 has its primary disposed in series with the line 66 and its secondary 72 connected to the input terminals of the bridge rectifier network 74. A second current transformer 76 has its primary connected in series with the line 68 and its secondary 78 connected to the input terminals of the second bridge rectifier 80. The two rectifiers have their outputs connected in series and they are also connected in series with the resistor 82 through the lines 84 and 86, the resistor 82 corresponding to the resistor 42 in Figure 4. The line 88 connects the positive output terminal of the rectifier 74 to the negative output terminal of the rectifier 80.

In this arrangement the biased rectifier principle is used in combination with two current transformers to create a rectified secondary current which has approximately the same wave shape as the motor armature current. A more conventional way of accomplishing substantially the same result would be to use three current transformers and a three phase bridge rectifier.

Figures 8 and 9 are reproductions of oscillograms illustrating the effect of the inductive voltage drop compensation and the form of the voltage that is present in the feedback circuit. Figure 8(a) illustrates the wave shape of the voltage $e$ applied to the motor while Figure 8(b) illustrates the wave shape of the feedback voltage $e_b$, both voltages being under full load conditions at 1/14 of full speed.

Figure 9(a) illustrates the wave shape of the voltage $e$ applied to the motor while Figure 9(b) illustrates the wave shape of the feedback voltage $e_b$, both voltages being under full load conditions at 1/80 of full speed.

The circuits shown in Figures 4, 5 and 6 have all incorporated the idea of creating a voltage equal to the inductive voltage drop in the motor, and a second voltage equal to the resistive voltage drop in the motor. These two voltages are subtracted from the armature voltage, and the resultant voltage which is equal to the motor E. M. F. (and which represents the speed of the motor) is used as the feedback voltage, and as a supply voltage for the anti-hunt means.

In Figure 7, on the other hand, a circuit is shown representing another embodiment of the invention in which, instead of creating a feedback voltage equal to the motor E. M. F., a voltage proportional thereto is created. In this circuit, if it is assumed that R is the resistance in the motor, the resistance R' is adjusted to be approximately KR where K is a constant. Likewise, if L is the inductance in the motor, L' is adjusted to be approximately KL. In order for the feedback voltage $e_b$ to be proportional to the E. M. F. of the motor, $e$, it has been found (as is shown below) that the feedback potentiometer 90 should be set so that the voltage E' is approximately $$\frac{KE}{1+K}$$

where K is a constant (which generally will be selected to be considerably smaller than 1) and where E is the voltage supplied to the armature from the regulator 14.

The following is proof of the fact that the relationship $$E' = \frac{KE}{1+K}$$

will give a feedback voltage $e_b$ that is proportional to $e$, the E. M. F. of the motor.

From Figure 7: If $e$=E. M. F. of motor, then $$e = E - (Ri + KRi + KLdi/dt + Ldi/dt)$$
$$e = E - (1+K)Ri - (1+K)Ldi/dt$$

$$\frac{e}{1+K} = \frac{E}{1+K} - Ri - Ldi/dt$$

(1) $$e = (1+K)\left(\frac{E}{1+K} - Ri - Ldi/dt\right)$$

Also from Figure 7: If $e_b$=feedback voltage, then (2) $$e_b = E' - KRi - KLdi/dt$$

If we assume $$E' = \frac{KE}{1+K}$$

then, substituting in (2):

$$e_b = \frac{KE}{1+K} - KRi - KLdi/dt$$

(3) $$e_b = K\left(\frac{E}{1+K} - Ri - Ldi/dt\right)$$

From (1) and (3):

$$\frac{e_b}{e} = \frac{K\left(\frac{E}{1+K} - Ri - Ldi/dt\right)}{(1+K)\left(\frac{E}{1+K} - Ri - Ldi/dt\right)}$$

$$\frac{e_b}{e} = \frac{K}{1+K}$$

$$e_b = \frac{K}{1+K}e$$

or $e_b$=constant times $e$, the constant being $\frac{K}{1+K}$

The feedback voltage $e_b$ is therefore approximately equal to $$\frac{K}{1+K}e$$

and under assumed ideal conditions, is a non-pulsating voltage proportional to the motor speed.

In all of the circuits described, the feedback voltage $e_b$ has been compared directly to the reference voltage. This, of course, is not essential since the comparison can be indirect. In such a case, the reference voltage and feedback voltage can be of different magnitude and can be isolated from each other, such as in the case of magnetic comparison used to control a magnetic amplifier regulator.

In the drawing and specification, there have been set forth several preferred embodiments of the invention, and although specific terms are employed, they are used in a generic and descriptive sense only and not for purposes of limitation. Changes in form and in the proportion of parts, as well as the substitution of equivalents are contemplated, as circumstances may suggest or render expedient, without departing from the spirit or scope of this invention as further defined in the following claims.

What is claimed is:

1. An adjustable speed drive comprising a direct current motor having an armature, an armature circuit, a magnetic amplifier with input terminals for alternating current and output terminals connected to said armature circuit to provide an adjustable unidirectional energizing voltage for said armature; control winding means in said magnetic amplifier, a control circuit connected to said control winding means and across said armature circuit so as to apply to the former a feedback voltage from said armature circuit, circuit means responsive to current supplied through said magnetic amplifier to said armature circuit, an inductance means in said control circuit series connected to said circuit means to provide a voltage component substantially equal to the inductive voltage drop in said motor and poled to reduce said feedback voltage by that amount, a resistor in said control circuit connected to said circuit means to provide a voltage component substantially equal to the resistive voltage drop in said motor and poled to reduce said feedback voltage by that amount, and an adjustable speed-control potentiometer connected in said control circuit so as to impress on said control winding means a reference voltage of adjustable magnitude balanceable against the reduced feedback voltage.

2. An adjustable speed drive comprising a direct current motor having an armature, an armature circuit, a magnetic amplifier with input terminals for alternating current and output terminals connected to said armature circuit to provide an adjustable unidirectional energizing voltage for said armature, control winding means in said magnetic amplifier, a control circuit connected to said control winding means and across said armature circuit so as to apply to the former a feedback voltage from said armature circuit, transformer means having a primary and secondary winding, said primary winding being connected in series with one of said output terminals of said magnetic amplifier and one side of said armature circuit, said secondary winding being series connected in said control circuit and having characteristics such as to provide a voltage component substantially equal to the inductive voltage drop in said motor and being poled to reduce said feedback voltage by that amount, circuit means responsive to current supplied to said input terminals of said magnetic amplifier, a resistor in said control circuit connected to said circuit means to provide a voltage component substantially equal to the resistive voltage drop in said motor and poled to reduce said feedback voltage by that amount, and an adjustable speed-control potentiometer connected in said control circuit so as to impress on said control winding means a reference voltage of adjustable magnitude balanceable against the reduced feedback voltage.

3. An adjustable speed drive comprising a direct current motor having an armature, an armature circuit, a magnetic amplifier with input terminals for alternating current and output terminals connected to said armature circuit to provide an adjustable unidirectional energizing voltage for said armature, control winding means in said magnetic amplifier, a control circuit connected to said control winding means and across said armature circuit so as to apply to the former a feedback voltage from said armature circuit, an inductance means and a resistance means connected in series in said control circuit, and circuit means responsive to current supplied to said input terminals of said magnetic amplifier connected to said inductance means and said resistance means, said last two named means providing voltage components substantially equal to the inductive and resistive voltage drops in said motor, respectively, and being poled so as to reduce said feedback voltage by the sum of said voltage components, and an adjustable speed-control potentiometer connected in said control circuit so as to impress on said control winding means a reference voltage of adjustable magnitude balanceable against the reduced feedback voltage.

4. An adjustable speed drive comprising a direct current motor having an armature, an armature circuit, a magnetic amplifier with input terminals for alternating current and output terminals connected to said armature circuit to provide an adjustable unidirectional energizing voltage for said armature, control winding means in said magnetic amplifier, a potentiometer having its resistance element connected across said output terminals of said magnetic amplifier, the movable arm of said potentiometer being connected to one side of said control winding means, means for connecting a source of direct current voltage between the remaining side of said control winding means and one side of said armature to provide a voltage component to said control winding means balanceable against a feedback voltage from said armature circuit, an inductance means and a resistance means connected in series in said armature circuit between one of said output terminals and the side of said armature connected to said direct current voltage means, said inductance means and said resistance means providing voltage components substantially equal to the inductive and resistive voltage drops in said motor, respectively, and being poled so as to reduce said feedback voltage by the sum of said voltage components so that said feedback voltage is proportional to the motor E. M. F.

5. An adjustable speed drive of the character described in claim 2 further characterized in that said circuit means responsive to current supplied to said input terminals of said magnetic amplifier comprises a current transformer, the primary of which is connected in series with one of the input terminals of said magnetic amplifier and the secondary of which is connected across said resistor.

6. An adjustable speed drive of the character described in claim 3, further characterized in that said circuit means responsive to current supplied to said input terminals of said magnetic amplifier comprises a current transformer, the primary of which is connected in series with one of the input terminals of said magnetic amplifier and the secondary of which is connected across the input terminals of a full wave rectifier, the output terminals of the latter being connected across said resistance means and said inductance means.

7. An adjustable speed drive of the character described in claim 1 further comprising a second control winding means in said magnetic amplifier, and an anti-hunt network having its input terminals connected across said control circuit and its output terminals connected across said second control winding means.

8. An adjustable speed drive of the character described in claim 2 further comprising a second control winding means in said magnetic amplifier, and an anti-hunt network having its input terminals connected across said control circuit and its output terminals connected across said second control winding means.

9. An adjustable speed drive of the character described in claim 3 further comprising a second control winding means in said magnetic amplifier, and an anti-hunt network having its input terminals connected across said control circuit and its output terminals connected across said second control winding means.

10. An adjustable speed drive of the character described in claim 4 further comprising a second control winding means in said magnetic amplifier, and an anti-hunt network having its input terminals connected to said movable arm of said potentiometer and to the side of said armature connected to said rectifier means.

11. An adjustable speed drive comprising a direct current motor having an armature, an armature circuit, a combined regulator and rectifier with input terminals for alternating current and output terminals connected to said armature circuit to provide an adjustable unidirectional energizing voltage for said armature, a control circuit for said combined regulator and rectifier connected across said armature circuit so as to apply to said combined regulator and rectifier a feedback voltage from said armature circuit, circuit means responsive to current supplied through said combined regulator and rectifier to said armature circuit, an inductance means in said control circuit connected to said circuit means to provide a voltage component substantially equal to the inductive voltage drop in said motor and poled to reduce said feedback voltage by that amount, a resistor in said control circuit connected to said circuit means to provide a voltage component substantially equal to the resistive voltage drop in said motor and poled to reduce said feedback voltage by that amount, and an adjustable speed control potentiometer connected in said control circuit so as to impress thereon a reference voltage of adjustable magnitude balanceable against the reduced feedback voltage.

12. An adjustable speed drive comprising a direct current motor having an armature, an armature circuit, a combined regulator and rectifier with input terminals for alternating current and output terminals connected to said armature circuit to provide an adjustable unidirectional energizing voltage for said armature, a control circuit for said combined regulator and rectifier connected across said armature circuit so as to apply to said combined regulator and rectifier a feedback voltage from said armature circuit, transformer means having a primary and secondary winding, said primary winding being connected in series with one of said output terminals of said combined regulator and rectifier and one side of said armature circuit, said secondary winding being series connected in said control circuit and having characteristics such as to provide a voltage component substantially equal to the inductive voltage drop in said motor and poled to reduce said feedback voltage by that amount, circuit means responsive to current supplied to said input terminals of said combined regulator and rectifier, a resistor in said control circuit connected to said circuit means to provide a voltage component substantially equal to the resistive voltage drop in said motor and poled to reduce said feedback voltage by that amount, and an adjustable speed-control potentiometer connected in said control circuit so as to impress thereon a reference voltage of adjustable magnitude balanceable against the reduced feedback voltage.

13. An adjustable speed drive comprising a direct current motor having an armature, an armature circuit, a combined regulator and rectifier with input terminals for alternating current and output terminals connected to said armature circuit to provide an adjustable unidirectional energizing voltage for said armature, a control circuit for said combined regulator and rectifier connected across said armature circuit so as to apply to said combined regulator and rectifier a feedback voltage from said armature circuit, an inductance means and a resistance means connected in series in said control circuit, and circuit means responsive to current supplied to said input terminals of said combined regulator and rectifier connected to said inductance means and said resistance means, said last two named means providing voltage components substantially equal to the inductive and resistive voltage drops in said motor, respectively, and being poled so as to reduce said feedback voltage by the sum of said voltage components, and an adjustable speed-control potentiometer connected in said control circuit so as to impress thereon a reference voltage of adjustable magnitude balanceable against the reduced feedback voltage.

14. An adjustable speed drive comprising a direct current motor having an armature, an armature circuit, a combined regulator and rectifier with input terminals for alternating current and output terminals connected to said armature circuit to provide an adjustable unidirectional energizing voltage for said armature, a control circuit for said combined regulator and rectifier, a potentiometer having its resistance element connected across said output terminals of said combined regulator and rectifier, the movable arm of said potentiometer and one of the terminals of said resistance element being connected in said control circuit, means for connecting a source of direct current voltage in said control circuit between said combined regulator and rectifier and one side of said armature to provide a voltage component to said control circuit balanceable against a feedback voltage from said armature circuit, an inductance means and a resistance means connected in series in said armature circuit and said control circuit between one of said output terminals of said combined regulator and rectifier and the side of said armature connected to said direct current voltage means, said inductance means and said resistance means providing voltage components substantially equal to the inductive and resistive voltage drops in said motor, respectively, and being poled so as to reduce said feedback voltage by the sum of said voltage components so that said feedback voltage is proportional to the motor E. M. F.

No references cited.